(12) United States Patent
Blomquist et al.

(10) Patent No.: US 11,829,056 B2
(45) Date of Patent: Nov. 28, 2023

(54) GRADE ANNUNCIATOR

(71) Applicant: USNR, LLC, Woodland, WA (US)

(72) Inventors: Christopher W. Blomquist, Ridgefield, WA (US); Carl Flatman, Salmon Arm (CA); Carl Wahlstrom, Woodland, WA (US); Mike O'Heron, Woodland, WA (US); Nick Sunder, Woodland, WA (US)

(73) Assignee: USNR, LLC, Woodland, WA (US)

( * ) Notice: Subject to any disclaimer, the term of this patent is extended or adjusted under 35 U.S.C. 154(b) by 216 days.

(21) Appl. No.: 17/102,203

(22) Filed: Nov. 23, 2020

(65) Prior Publication Data
US 2021/0072627 A1 Mar. 11, 2021

Related U.S. Application Data

(63) Continuation of application No. 15/841,173, filed on Dec. 13, 2017, now Pat. No. 10,845,682, which is a continuation of application No. 14/026,895, filed on Sep. 13, 2013, now Pat. No. 9,874,803.

(60) Provisional application No. 61/801,938, filed on Mar. 15, 2013, provisional application No. 61/714,724, filed on Oct. 16, 2012.

(51) Int. Cl.
*G03B 21/14* (2006.01)
*B27B 31/06* (2006.01)
*G01B 11/25* (2006.01)

(52) U.S. Cl.
CPC .............. *G03B 21/14* (2013.01); *B27B 31/06* (2013.01); *G01B 11/25* (2013.01)

(58) Field of Classification Search
CPC .. G01N 33/46; G01N 21/8986; G06T 7/0057; G01B 11/2522; G01B 11/2518; G01B 11/25; G03B 21/00–64; B27B 31/06
See application file for complete search history.

(56) References Cited

U.S. PATENT DOCUMENTS

| 4,086,496 A | * | 4/1978 | Berry | G01B 11/046 |
| | | | | 144/357 |
| 4,541,722 A | * | 9/1985 | Jenks | B27B 31/06 |
| | | | | 83/365 |
| 6,031,567 A | * | 2/2000 | Johnson | H04N 7/181 |
| | | | | 348/E7.086 |

(Continued)

*Primary Examiner* — Bao-Luan Q Le
*Assistant Examiner* — Christopher A Lamb, II
(74) *Attorney, Agent, or Firm* — Schwabe, Williamson & Wyatt, P.C.

(57) ABSTRACT

Embodiments provide grade annunciator systems that allow a lumber workpiece traveling in a workflow path to be labeled with a projected image that conveys information about the grade, a cut line, and/or the location of a defect in the workpiece. In some embodiments, the system includes a conveyor configured to convey lumber workpieces in a workflow path, and a projector or series of projectors configured to project an image or symbol onto a surface of the workpiece, wherein the image or symbol indicates grade, a cut line, and/or the location of a defect in the workpiece. Other embodiments are methods of labeling a lumber workpiece in a workflow path, the methods includes conveying the lumber workpiece along the workflow path, and projecting an image or symbol onto a surface of the workpiece as it is conveyed along the workflow path.

20 Claims, 9 Drawing Sheets

(56) References Cited

U.S. PATENT DOCUMENTS

2011/0050872 A1\* 3/2011 Harbert .................. G01N 33/12
235/375

\* cited by examiner

GRADE ANNUNCIATOR

CROSS REFERENCE TO RELATED APPLICATIONS

The present application is a continuation of U.S. patent application Ser. No. 15/841,173, filed Dec. 13, 2017, which is a continuation of U.S. patent application Ser. No. 14/026,895, filed Sep. 13, 2013, which claims priority to U.S. Provisional Patent Application No. 61/714,724, filed Oct. 16, 2012, and to U.S. Provisional Patent Application No. 61/801,938, filed Mar. 15, 2013, all entitled "GRADE ANNUNCIATOR," the entire disclosures of which are hereby incorporated by reference in their entirety.

TECHNICAL FIELD

Embodiments herein relate to the field of lumber processing methods and equipment, and more specifically, to devices and methods for grading and/or tracking, lumber in a lumber processing unit.

BACKGROUND

The production of lumber often involves the use of automated grading systems that use image scanning and processing techniques to identify grade and other characteristics of lumber travelling longitudinally over a conveyor. Once a piece of lumber has been graded, it may be marked with a stamp, ink, or another physical mark to display the grade and sometimes other attributes of each piece of lumber. Typically, this is done by spraying visible colored ink representing various grades onto the lumber.

The lumber is generally transported on lugged or unlugged chains transversely through a mill. Grade printers may be located downstream of a board trimmer to apply a stamp to each board. For example, a lumber grader might call for grade #2-8' on a near end of a board and grade #3-10' on a far end of the board. When this happens, a trimmer will cut an eighteen foot board in two pieces at approximately an eight foot position. Once these different grade boards are on different lugs, they may be stamped with the appropriate grade stamps.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1:
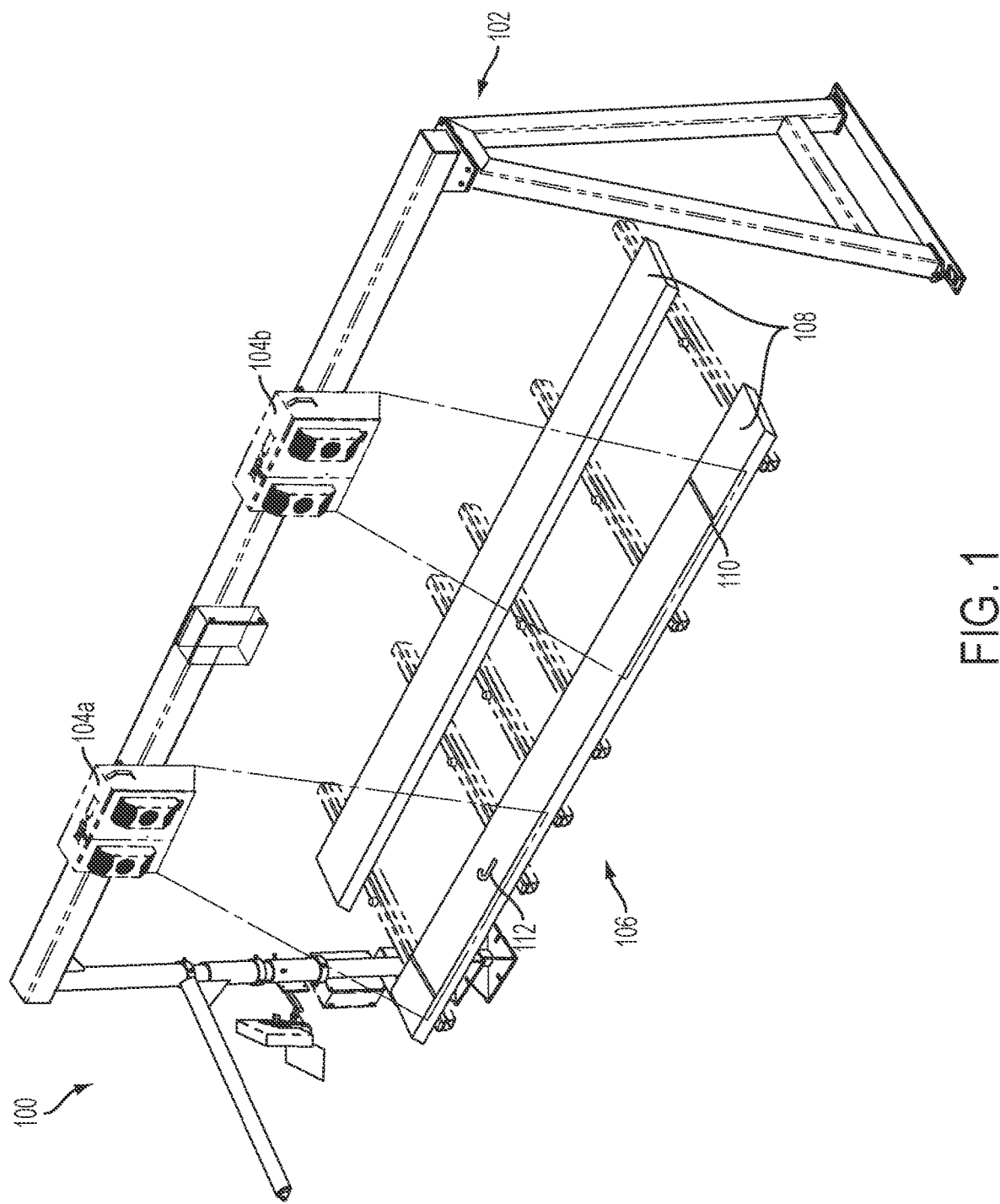
FIG. 1 illustrates a block diagram of a grade annunciator apparatus in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Embodiments herein provide methods, systems, and apparatus for displaying letters, numbers, indicia, and/or images on boards during lumber processing. Various embodiments of the disclosed methods, systems, and apparatus may display lumber grade information and/or other information on boards travelling through a lumber processing unit, for instance as they pass by check graders. In various embodiments, the system may use one or more projectors, for example, one or more projectors mounted above the lumber flow, to project the grade determined by an optimizer, cut marks, or other information directly onto each board as it passes. In some embodiments, the system may track the projection with the board as it passes by check graders, for instance with an overheard vision camera system. In other embodiments, the image may be stationary as the boards pass by. In some embodiments, a series of stationary images may be projected sequentially from a series of projectors, LEDs, or other light sources, and thus may provide what appears to be an image that travels with each board. In one embodiment, an ID reader device operatively coupled to the light sources determines the identity and/or sequence of the boards.

The projected images may include text, symbols, colored boxes, and/or any other type of image. In some embodiments, a first projector may be used to project text and a second projector may be used to project a shape (e.g., a box or a circle) onto a defect on a workpiece.

Although generally very accurate, automatic grading systems may still require quality control checks, for instance, to ensure that the system is highly tuned. Thus, in various embodiments, check graders may need to receive information regarding the grade the optimizer has assigned to a piece so that they may assess it for accuracy, an so that they may make any desired parameter changes. Additionally, the system may be configured to indicate the location of one or more defects in a board, for example on the top or side of a board. Optionally, the system may be configured to indicate a grade-limiting defect by projecting a mark onto the defective area of the workpiece. This may allow an operator to quickly determine whether the assigned grade is correct or should be changed, and/or to check for other defects not indicated by the system. Thus, various embodiments disclosed herein may provide a simple and effective alternative to traditional paint spray systems and complicated lighting systems. In various embodiments, the boards may emerge from the system having not been marked in any way, such that the freshly planed lumber may remain clean and visually appealing.

In various embodiments, projected symbols and/or colors representing the various grades or other criteria may be customized, thus allowing a user to create symbols that match symbols already in use in a given facility. In some embodiments, saw lines, including near end, far end, and cut-in-two may be projected onto the material in their respective locations, making it easy for a user to view trim decisions. In various embodiments, multiple grades may be projected onto the material, for instance in order to display multi-grade cut-in-two decisions.

In various embodiments, the projections resulting from the disclosed methods, processes, and apparatus may be highly accurate, and may allow materials to be tracked on any surface, such as smooth chain or lugged chain. In some embodiments, the disclosed processes, methods, and apparatus may detect skewed material, and may adjust accordingly. In various embodiments, projecting the grades and other indicia onto the materials (e.g., instead of using traditional paint-based methods), may leave the lumber clean and free of marks.

In various embodiments, the information encoded by the projected text, symbols, and images may include one or more cut lines, marketing information, a downstream destination for the workpiece (e.g., a bin number), a safety message, production information, an advertisement, a cartoon, or any other type of still or moving image. In a specific example, the system may project several images onto a workpiece (e.g., dimensions, grade, and bin number).

In still other embodiments, the projector(s) may project the image(s) onto an object other than the workpiece, such as a wall or a conveyor surface (e.g., a high-contrast surface on the side of a conveyor). Alternatively, the projector(s) may project the image(s) onto the top, side, or end of a workpiece. For example, the system may include a plurality of projectors positioned to project images onto the ends of successive boards.

The system may be used to project images onto workpieces upstream or downstream of a trimmer. Alternatively, the system may be used to project images onto workpieces before or after processing by an edger (flitches), a gang (cants), a resaw (vertical/horizontal), a sorter, or a rip/chop saw (e.g., in remanufacturing systems). In addition, the system may be used to project images onto a log, such as rotational information, log grade/classification, and/or cut pattern.

In one example, a workpiece may be marked with a bar code (which may be, e.g., printed in an ultraviolet ink) that identifies the workpiece. In some embodiments, an ultraviolet light source may be positioned above the conveyor, and a camera may be positioned to detect the bar code. The camera may then communicate identifying information about the workpiece to one or more projectors, which may then project an image onto the workpiece based on the identifying information.

FIG. 1 illustrates a block diagram of a grade annunciator apparatus 100 in accordance with various embodiments. As illustrated, grade annunciator apparatus 100 may include a frame 102 and one or more projector devices 104 mounted to frame 102. In the illustrated embodiment, two projector devices 104 are shown mounted to a frame 102 portion over a conveyor 106 on which workpieces 108 are being conveyed in a transverse orientation. It is to be understood, however, that in other embodiments the location, number, orientation, and configuration of the projector devices, as well as the orientation of the lumber relative to the frame/conveyor/projectors, may be different than in the illustrated example. In the illustrated example, a cut mark 110 and a plurality of grade indicators 112 are projected onto the work pieces.

Figure 2:
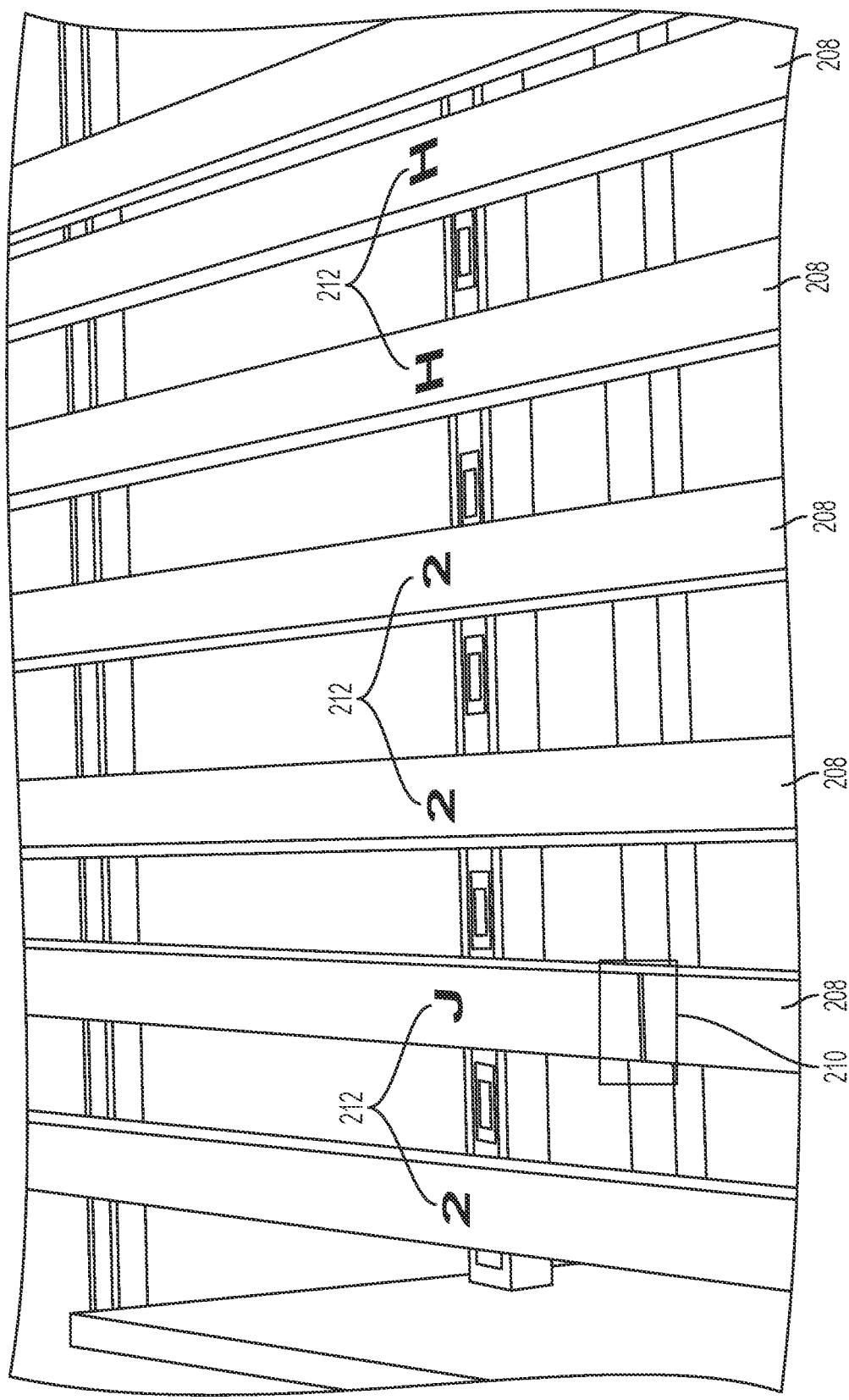
FIG. 2 illustrates a projected image from a grade annunciator apparatus.

FIG. 2 illustrates a projected image from a grade annunciator apparatus. As shown, an elongate bar-shaped image 210 may be projected onto a workpiece 208 to indicate a saw line. Optionally, an alphanumeric character, symbol, or other image 212 may be projected onto the workpiece 208. In some embodiments, a shape (e.g., a square or rectangle) may be projected onto a workpiece to indicate the location of a defect, such a grade-limiting defect.

Figure 3:
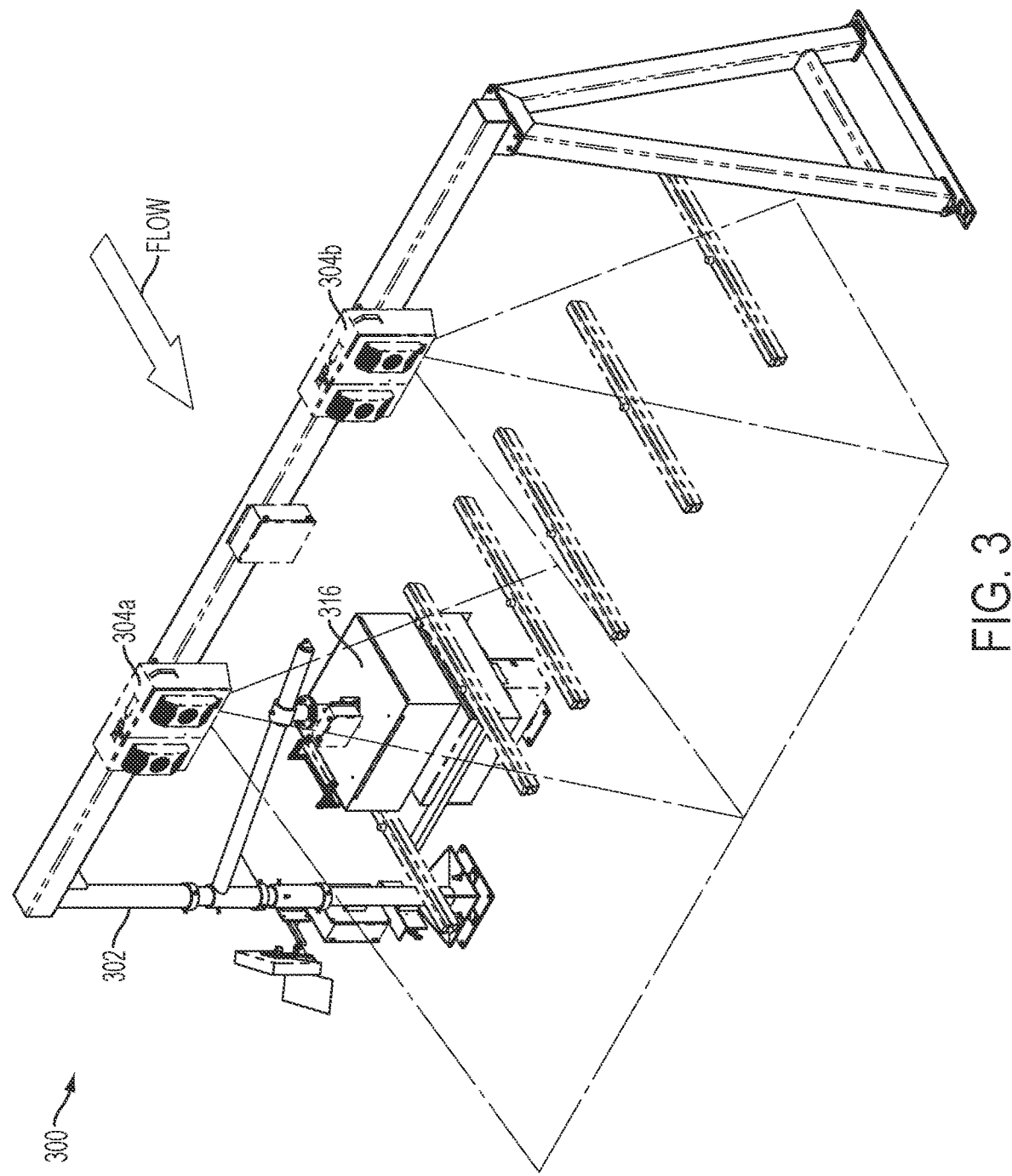
FIG. 3 illustrates a perspective view of a grade annunciator apparatus.

FIG. 3 illustrates a perspective view of a grade annunciator apparatus 300. Grade annunciator apparatus 300 may include a frame 302 and one or more projector devices mounted to frame 302. Optionally, an ID reader assembly 316 may be part of, or be coupled to, frame 302. Frame 302 may further include two or more generally vertical supports coupled to a generally horizontal support. The generally horizontal support may be positioned above a transport surface (e.g., generally perpendicular to a direction of flow). The one or more projector devices 304 may be mounted to the horizontal support. Alternatively, the projector device(s) 304 may be mounted to the vertical supports or to another structure, such as a wall, a beam, or a portion of an upstream or downstream component of a workpiece processing line.

Figure 4:
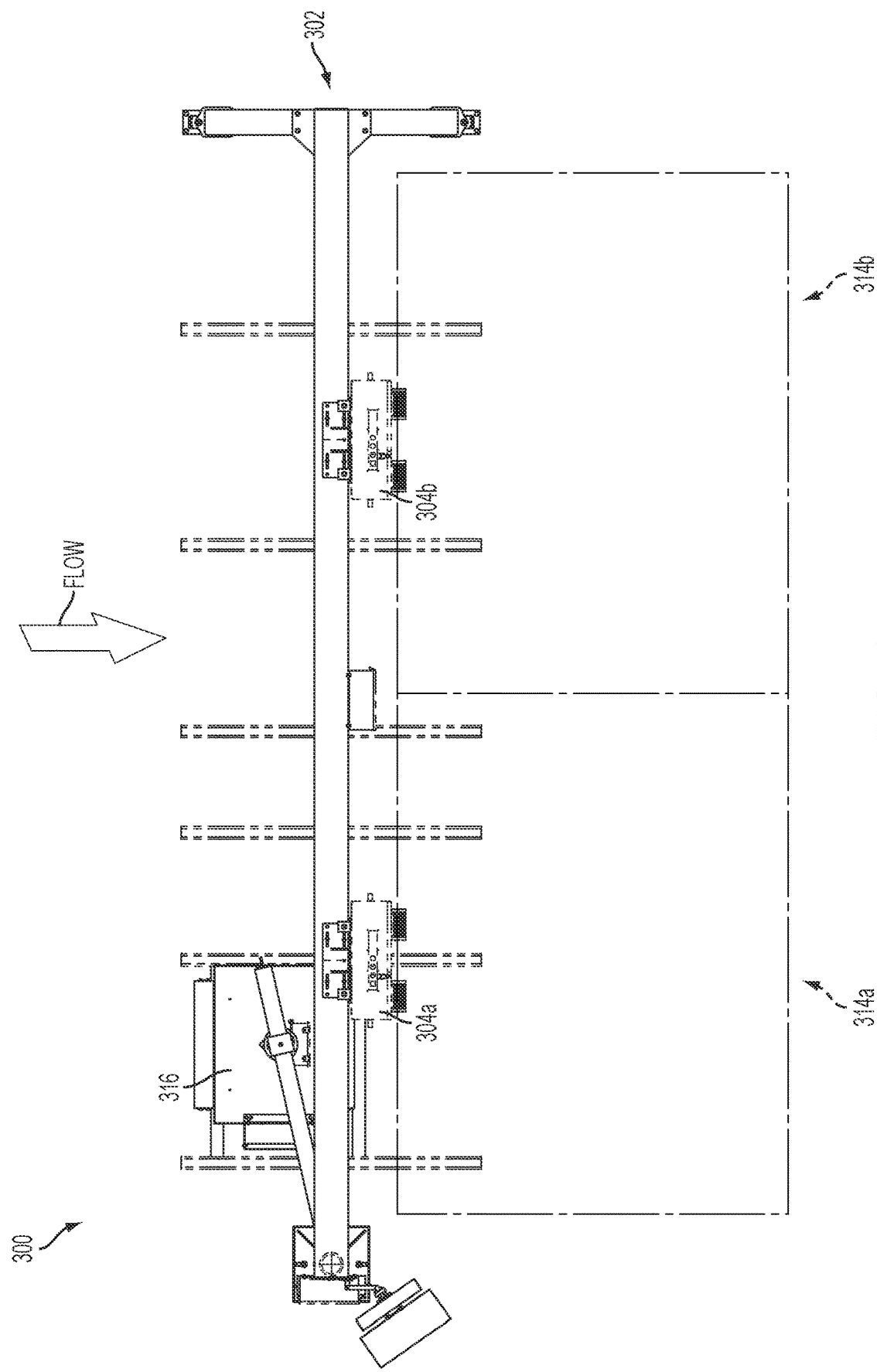
FIG. 4 illustrates a plan view of the grade annunciator apparatus of FIG. 3.
Figure 5:
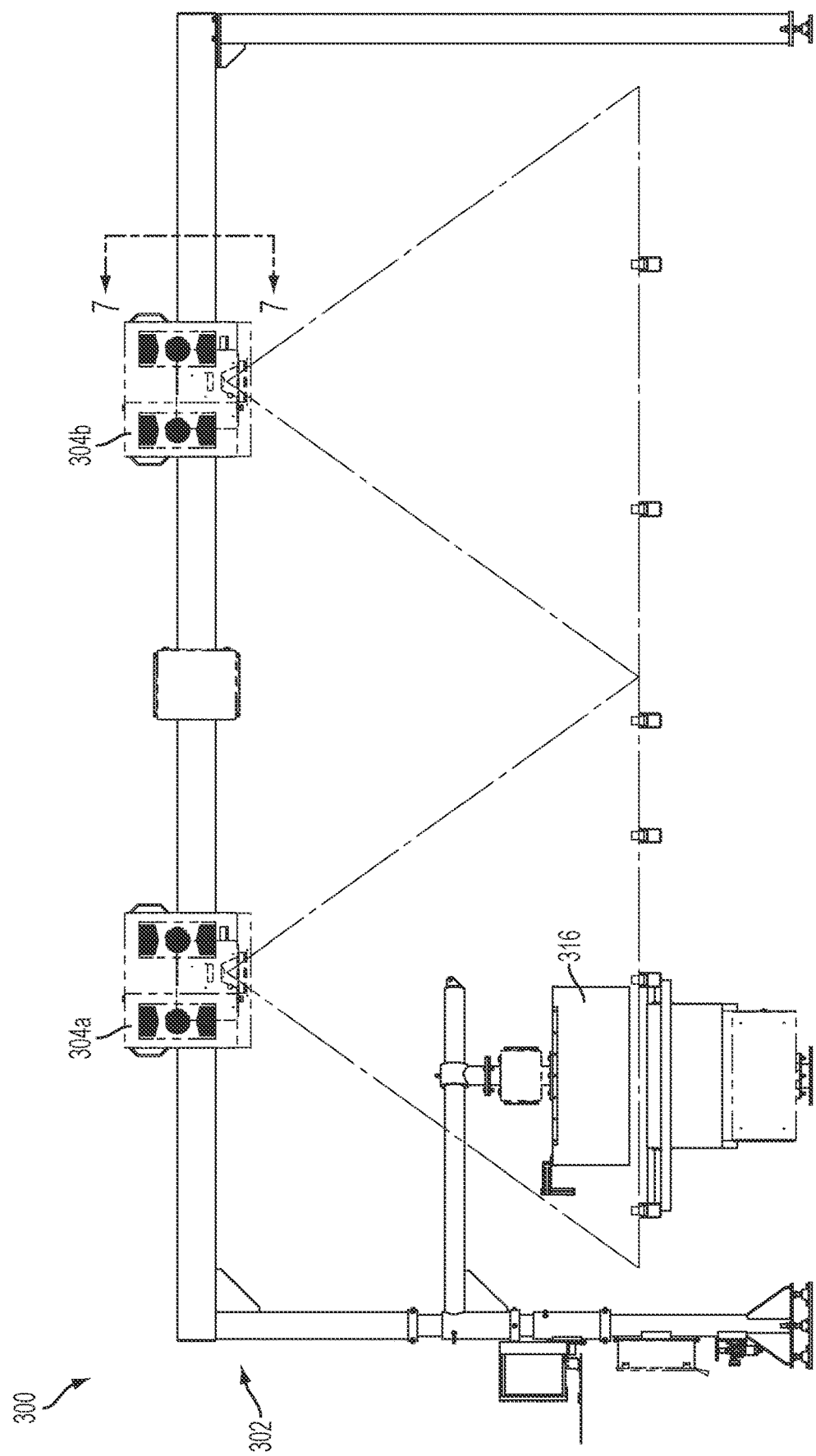
FIG. 5 illustrates an elevational view of the grade annunciator apparatus of FIG. 3.
Figure 6:
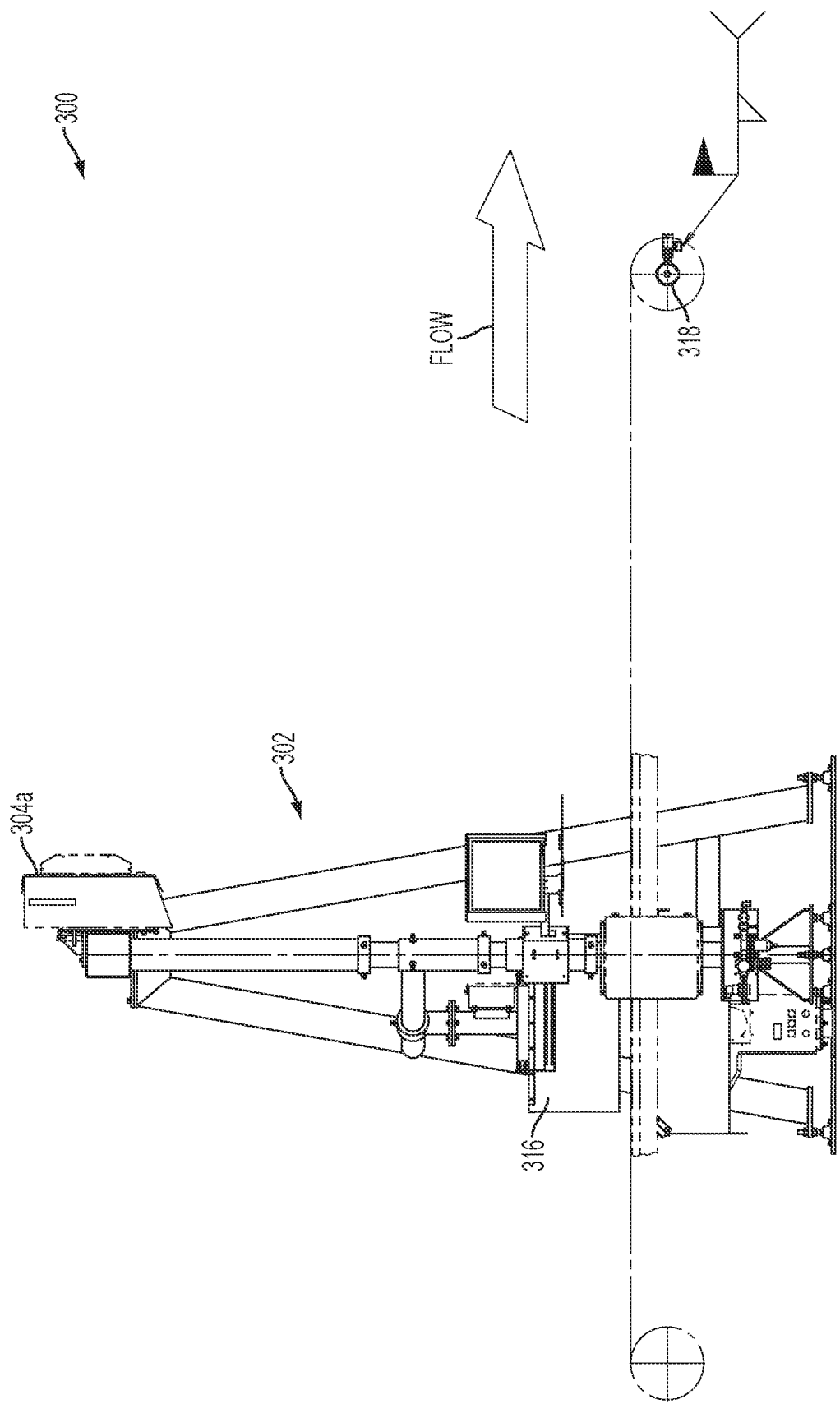
FIG. 6 illustrates a side elevational view of the grade annunciator apparatus of FIG. 3.

FIGS. 4-6 illustrate a plan view (FIG. 4), an elevational view (FIG. 5), and a side elevational view (FIG. 6), respectively, of grade annunciator apparatus 300. Two or more projectors 304 may be positioned on frame 302 such that their fields of projection 314a, 314b meet or overlap across the underlying transport surface. The ID reader 316 may be positioned over the transport surface in order to read an identifier on a workpiece on the transport surface (e.g., a bar code printed in ultraviolet ink on the workpiece). Optionally, one or more lights (e.g., LED, ultraviolet light source, etc.) may be coupled to frame 302, ID reader assembly 316, and/or other structure proximal to the grade annunciator apparatus 300. In some embodiments, an ID printer and/or a second ID reader may be positioned upstream of the grade annunciator apparatus. As shown in FIG. 6, an encoder 318 may be provided downstream of frame 302.

Figure 7:
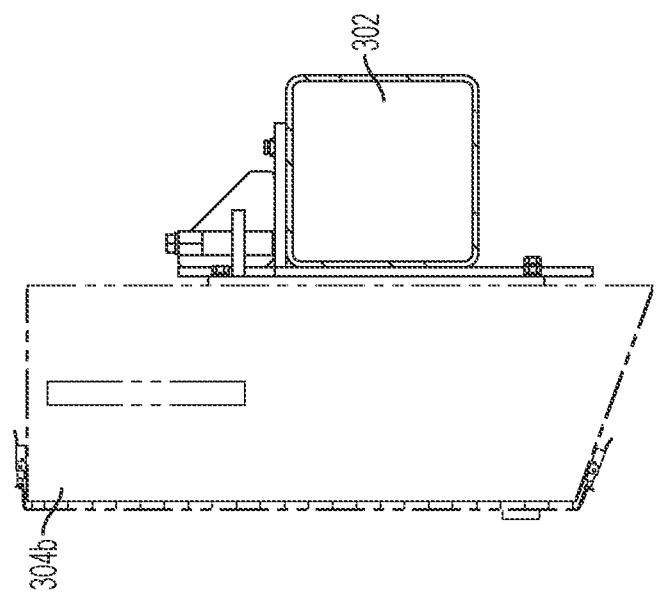
FIG. 7 illustrates a sectional view of a projector housing taken along lines A-A of FIG. 5.

FIG. 7 illustrates a sectional view of a projector housing taken along lines A-A of FIG. 5.

Figure 8:
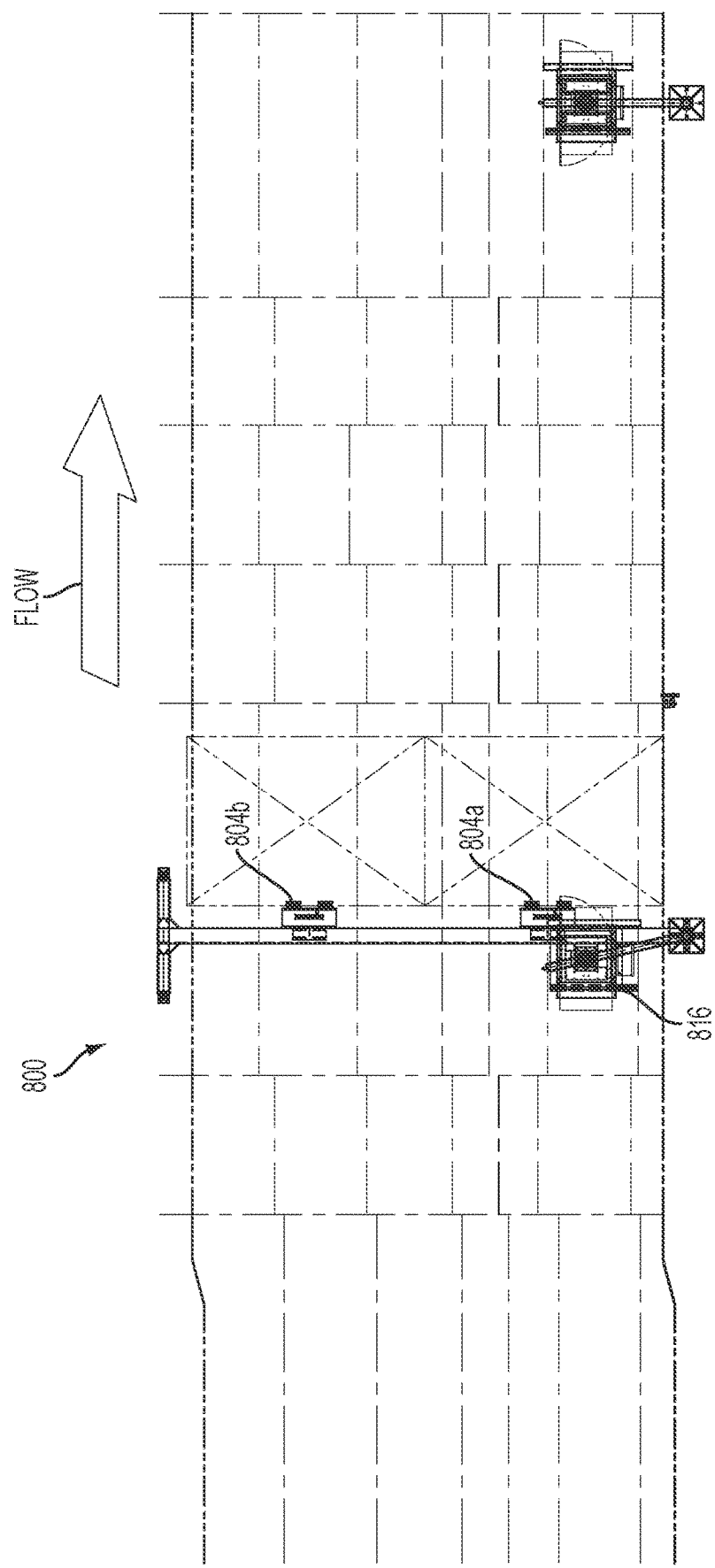
FIG. 8 illustrates a plan view of a transverse portion of a processing line with a grade annunciator apparatus as shown in FIGS. 3-7.
Figure 9:
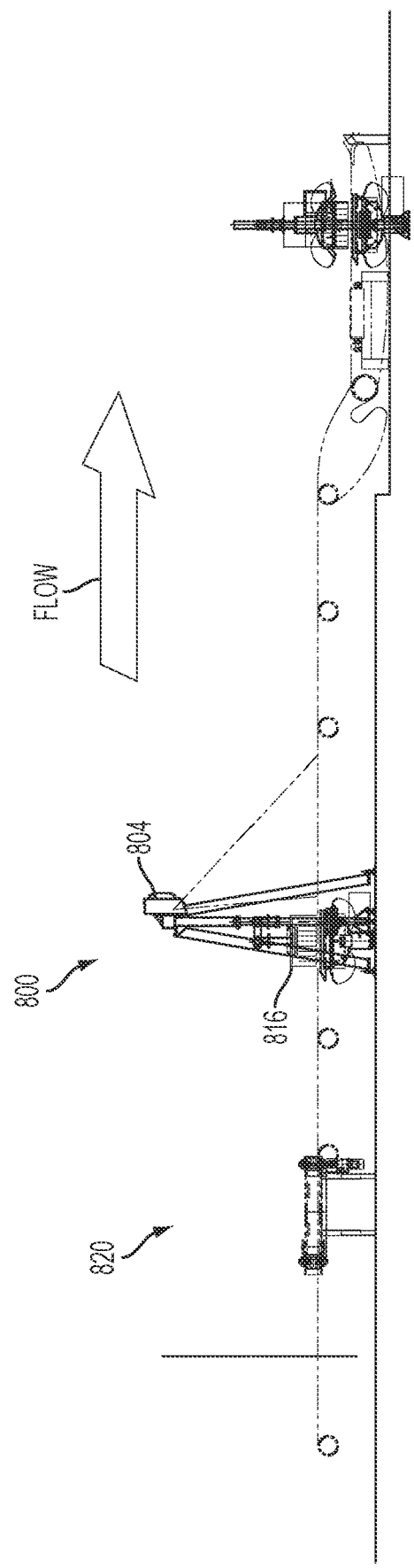
FIG. 9 illustrates an elevational view of the transverse portion of the processing line shown in FIG. 8, all in accordance with various embodiments.

FIGS. 8-9 illustrate a plan view and an elevational view, respectively, of a transverse portion of a processing line that includes a grade annunciator apparatus 800. As illustrated, workpieces may be even-ended by a fence or other board ending device positioned upstream of the grade annunciator apparatus 800. One or more storage/landing tables 820 may also be positioned upstream of the grade annunciator apparatus 800. The workpieces may be conveyed on a lugged transfer through the grade annunciator apparatus 800. Optionally, ID codes printed on the ends of the workpieces may pass below the ID reader 816, which may be in electronic communication with a computer system and the projector devices 804a, 804b. Based on the detected code of the workpiece and workpiece characteristic data associated with that ID code (e.g., scan data from an upstream scanner), the computer system may determine that one or more alphanumeric characters, symbols, shapes, and/or other images should be projected onto that workpiece. The computer system may also identify a target location on the workpiece, such as a location of a significant defect, for projection of an image. The computer system may then control the projector devices, directly or via a controller, to project the selected image(s) onto the workpiece in the desired location(s). One or more human operators may be positioned within view of the projected images in order to confirm or reject the grade decisions and/or other information represented by the projected images.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

We claim:

1. A grade annunciator system for displaying information about a lumber workpiece as the workpiece travels in a first direction along a workflow path on a conveyor, the grade annunciator system comprising:
one or more projectors positioned to project one or more images onto a surface of a workpiece that is on a first portion of the conveyor; and
a computer system configured to
determine a cut pattern for the workpiece based at least in part on scan data acquired by a scanner upstream of the first portion of the conveyor, wherein the cut pattern defines a first and a second cut product to be cut from the workpiece by cutting the workpiece transversely along at least a first predicted cut line, and wherein the first cut product has a first grade and the second cut product has a second grade, and
cause the one or more projectors to project the first grade and the second grade onto corresponding portions of the workpiece on the first portion of the conveyor.

2. The grade annunciator system of claim 1, wherein the computer system is further configured to cause the one or more projectors to project the first predicted cut line or an indication of a defect onto a corresponding portion of the surface of the workpiece.

3. The grade annunciator system of claim 1, wherein the one or more projectors includes a first projector and a second projector, and the projectors are spaced apart across the direction of workpiece flow.

4. The grade annunciator system of claim 3, wherein the first projector and the second projector have respective fields of projection that meet or overlap across the first portion of the conveyor.

5. The grade annunciator system of claim 1, wherein the projected one or more images moves with the workpiece as the workpiece travels along the workflow path.

6. The grade annunciator system of claim 5, wherein the system further comprises an overhead vision camera system in communication with the computer system, wherein the overhead vision camera system is configured to track the workpiece as the workpiece travels along the workflow path.

7. The grade annunciator system of claim 6, wherein the one or more projectors comprises a series of projectors arranged along the workflow path, and wherein the series of projectors is operable to sequentially project the one or more images onto the workpiece on respective portions of the conveyor such that the projected one or more images moves with the workpiece as the workpiece travels along the workflow path.

8. The grade annunciator system of claim 6, wherein the one or more projectors comprises a series of LEDs arranged along the workflow path, and wherein the series of LEDS is configured to sequentially project the one or more images, such that the one or more images is projected onto the workpiece as the workpiece travels along the workflow path.

9. The grade annunciator system of claim 1, wherein the one or more images remains stationary as the workpiece travels along the workflow path.

10. The grade annunciator system of claim 1, wherein the one or more images comprises a letter, a number, a color, a geometric shape, or a line.

11. The grade annunciator system of claim 1, wherein the system further comprises an identification reader in communication with the computer system, and wherein the identification reader is configured to detect an identification code on the workpiece as the workpiece travels along the workflow path.

12. The grade annunciator system of claim 1, wherein the conveyor comprises a lugged chain.

13. A method of labeling a lumber workpiece as the workpiece travels on a conveyor along a workflow path, the method comprising:
determining a cut pattern for the workpiece based at least in part on scan data acquired by a scanner upstream of the first portion of the conveyor, wherein the cut pattern defines a first and a second cut product to be cut from the workpiece by cutting the workpiece transversely along at least a first predicted cut line, and wherein the first cut product has a first grade and the second cut product has a second grade, and
causing one or more projectors to project the first grade and the second grade onto corresponding portions of the workpiece on a first portion of the conveyor.

14. The method of claim 13, further including causing the one or more projectors to project the first predicted cut line or an indication of a defect onto a corresponding portion of the surface of the workpiece.

15. The method of claim 13, wherein the one or more projectors includes a first projector and a second projector, and the projectors are spaced apart across the direction of workpiece flow.

16. The method of claim 15, wherein the first projector and the second projector have respective fields of projection that meet or overlap across the first portion of the conveyor, and causing the one or more projectors to project the grades onto the workpiece includes causing the first projector to project the first grade onto the workpiece and causing the second projector to project the second grade onto the workpiece.

17. The method of claim 13, wherein causing the one or more projectors to project the grades onto the workpiece includes projecting the one or more images onto additional portions of the conveyor such that the one or more images moves with the workpiece as the workpiece travels along the workflow path.

18. The method of claim 17, further comprising causing an overhead vision camera system in communication with the computer system to track the workpiece as the workpiece travels along the workflow path.

19. The method of claim 18, wherein the one or more projectors comprises a series of projectors arranged along the workflow path, and wherein causing the one or more projectors to project the grades onto the workpiece includes causing the series of projectors to sequentially project the one or more images onto the workpiece along respective portions of the conveyor such that the projected one or more images moves with the workpiece as the workpiece travels along the workflow path.

20. The method of claim 18, wherein the one or more projectors comprises a series of LEDs arranged along the workflow path, and wherein the series of LEDS is configured to sequentially project the one or more images, such that the one or more images is projected onto the workpiece as the workpiece travels along the workflow path.

* * * * *